(12) United States Patent
Moreno (10) Patent No.: US 6,199,356 B1
(45) Date of Patent: Mar. 13, 2001

(54) LAWNMOWER RAKING ATTACHMENT

(76) Inventor: Gil G. Moreno, 4106 Dellbrook Dr., Tampa, FL (US) 33624

( * ) Notice: Subject to any disclaimer, the term of this patent is extended or adjusted under 35 U.S.C. 154(b) by 0 days.

(21) Appl. No.: 09/415,495

(22) Filed: Oct. 12, 1999

Related U.S. Application Data (63) Continuation-in-part of application No. 09/130,028, filed on Aug. 6, 1998, now abandoned.

(51) Int. Cl.[7] ................................................ A01D 43/02
(52) U.S. Cl. ........................................ 56/193; 56/400.14
(58) Field of Search ..................... 56/400.14, 17.5, 56/16.9, 400.04, DIG. 7, 440.13, 400.21, DIG. 21, 193

(56) References Cited

U.S. PATENT DOCUMENTS

| | | | |
|---|---|---|---|
| Re. 32,551 | * 12/1987 | Doering | 56/396 |
| 2,143,402 | * 1/1939 | Baker | 56/249 |
| 2,648,946 | * 8/1953 | Kelly | 56/193 |
| 3,438,183 | * 4/1969 | Puretic | 56/193 |
| 3,765,159 | * 10/1973 | Neff | 56/375 |
| 3,952,490 | 4/1976 | Brockman . | |
| 4,009,560 | 3/1977 | Wells . | |
| 4,299,079 | 11/1981 | Lambert . | |
| 4,312,095 | 1/1982 | Mullins . | |
| 4,541,230 | 9/1985 | Huerter . | |
| 4,573,311 | 3/1986 | Ipema et al. . | |
| 4,635,429 | 1/1987 | Cornelius . | |
| 4,848,073 | 7/1989 | Germain et al. . | |
| 4,987,731 | 1/1991 | Cianciulli . | |

FOREIGN PATENT DOCUMENTS

2340131 * 2/1975 (DE) ............................. A01D/35/00

* cited by examiner

Primary Examiner—Robert E. Pezzuto
Assistant Examiner—Meredith C. Petravick

(57) ABSTRACT

A lawnmower raking attachment comprising a plurality of flexible tines anchored to a tine head held rotatable and lockable between the side arms of a U-shaped frame near the close end. Each tine extending downwardly, having the free end bent forwardly to engage the thatch during the forward travel, having each at least one slidable and rotatable bead. A first and second frame supports with vertical slots having the upper end open to accept pivotally a shaft connecting the open end of the U-shaped frame. Latch arms are disposed pivotally on the frame supports to prevent the shaft to escape from the support slots but allowing to rotate to adopt stable operational or resting positions. Stoppers affixed to the frame supports limit the rotational travel of the U-shaped frame. A finger arm pivoted on one frame side near the shaft engages one stopper and prevents the rake frame from going to the resting position unless is manually disengaged.

6 Claims, 8 Drawing Sheets

LAWNMOWER RAKING ATTACHMENT

This is a continuation-in-part of application Ser. No. 09/130,028 filed Aug. 6, 1998, now abandoned.

BACKGROUND OF THE INVENTION

The well known hand rakes do an excellent job but require extraordinary human effort. Raking the lawn, in addition to cleaning the lawn, improve the aeration of the soil which is very important for a healthy lawn. Modern lawnmowers have powerful suction effect to remove some thatch that is not trapped by the grass or is not too close to the ground. They do not provide the scratching effect necessary to remove trapped thatch and for soil aeration. It has long been recognized the possibility of using an attachment to the lawnmower for raking purposes. U.S. Pat. No. 4,541,230 issued on Sep. 17, 1985 is too complicated for the common home maintenance lawn person. In order for a lawnmower raking attachment to perform an effective raking operation, it must have tines that satisfy two conditions. First they must be very flexible to flex in a longitudinal and transverse directions relative to the travel direction of the lawnmower. Secondly they must be close spaced to be able to carry forward tiny thatches. Satisfying these conditions cause the tines to entangle with each other requiring manual disengagement. In any raking device there is a tendency of the thatch to be hooked by the tines in an accumulative manner requiring manual removal.

SUMMARY OF THE INVENTION

The principal object of the present invention is to provide a lawnmower raking attachment that overcomes the problems confronted by a lawnmower raking attachment, is simple, of light weight and economical to manufacture.

It is also an object of the present invention to provide a lawnmower raking attachment that scratches the soil for thatch removal and aeration.

A further object of the present invention is to provide a lawnmower raking attachment that is safe to operate.

The present invention provides a plurality of flexible tines anchored to a raking head held rotatably between the two side arms of a U-shaped frame and near its close end. A transverse shaft at the open end of said U-shaped frame pivots in a first and second frame supports. Said first and second frame supports are attached to the forward end of a lawnmower. Stoppers are disposed on said first and second frame supports to limit the rotational travel of said U-shaped frame in the forward and backward directions, allowing said U-shaped frame to adopt a forwardly stable operational position, or an upwardly stable resting position. Said raking head can be rotated and locked into a position to adjust the pressure of said tines on the ground by a first and second thumbscrews. Said tines have their free ends bent to facilitate the engagement of the tines with the thatches. Each tine has at least one heavy slidable bead. When the lawnmower moves forward said plurality of tines scratch the soil loosening the thatches, sucking some or moving some forward where they can be collected. Moving the lawnmower backward disengages the tines from the soil and releases the thatches trapped or hooked by the tines. Said beads allow the tines to be spaced very close without entangling with each other during the raking operation due to the rolling effect among them. Close spacing of tines is very desirable for moving tiny thatch like small leaves during raking operation. In addition said beads prevent any thatch to be hooked beyond the bead making easy their removal by simply moving the lawnmower a little backward. The normal vibration of the lawnmower is transmitted to said beads increasing the penetration of said tines in the lawn surface. Said U-shaped frame can be rotated backward manually and maintained in a resting position by two of said support stoppers.

DESCRIPTION OF THE PREFERRED EMBODIMENT

Referring to FIGS. 1 through 9 the lawnmower raking attachment generally designated 10, has a plurality of flexible tines 11 anchored to a raking head member 12. Said tines 11 are made of very flexible steel and preferably of round cross section. Two tines 11 are formed by bending a long heat treated steel rod in a U-shape. The close end of the U-shaped tines is secured with screws 13 to said raking head member 12. Said tines 11 extend downwardly from the raking head. Said raking head member 12 has a first and second end caps 14 and 14a respectively. Said end caps 14 and 14a have respectively threaded bores 15 and 15a on line with the axis of said raking head member 12. Said tines 11 have a small portion 16 of their free end bent in planes perpendicular to an axial plane of said raking head member 12. Said tines 11 may be built from untreated steel rods and hardened after all bends are made. Beads 17 are preferably of ellipsoidal shape and of heavy material. Said beads 17 have a bore along their axis of diameter greater than the diameter of said tines 11. Each tine 11 is inserted inside the bore of at least one bead 17 before 16 is bent. Said beads 17 can rotate and slide on said tines 11 but are prevented to escape by said 16. Said beads 17 may have an axial slot to introduce said tines 11 into said axial bore that can be closed by compression after said tines 11 are introduced into said axial bore. Tine rack 18 is disposed in a plane perpendicular to the plane of said tines 11. Said tine rack 18 is secured to said raking head 12 by screws 19. Groves width of said tine rack 18 are sized to embrace two integral tines 11. The purpose of said tine rack 18 is to maintain proper separation of said tines 11.

Figure 1:
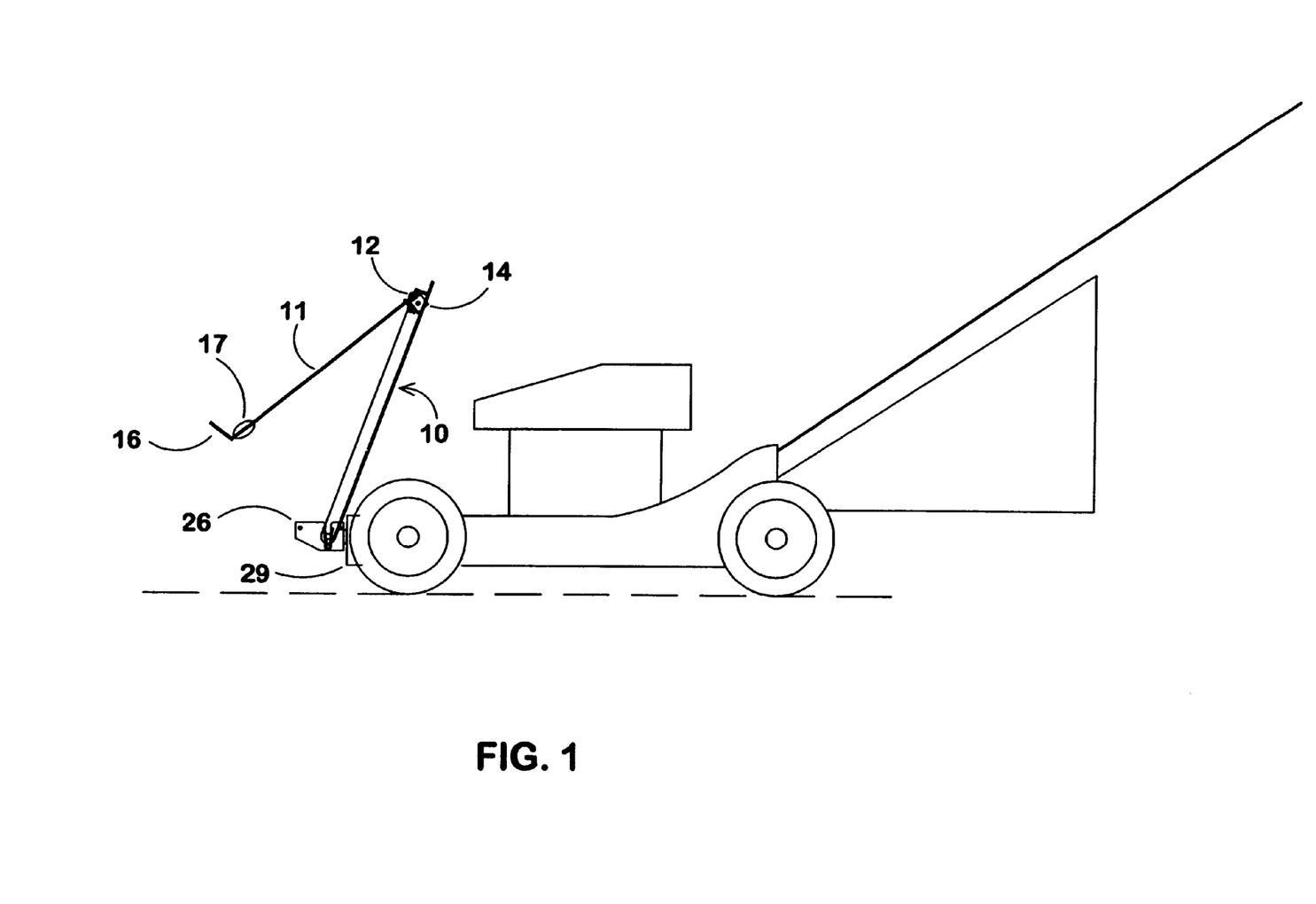
FIG. 1 is side elevation view of the lawnmower raking attachment in resting position.
Figure 2:
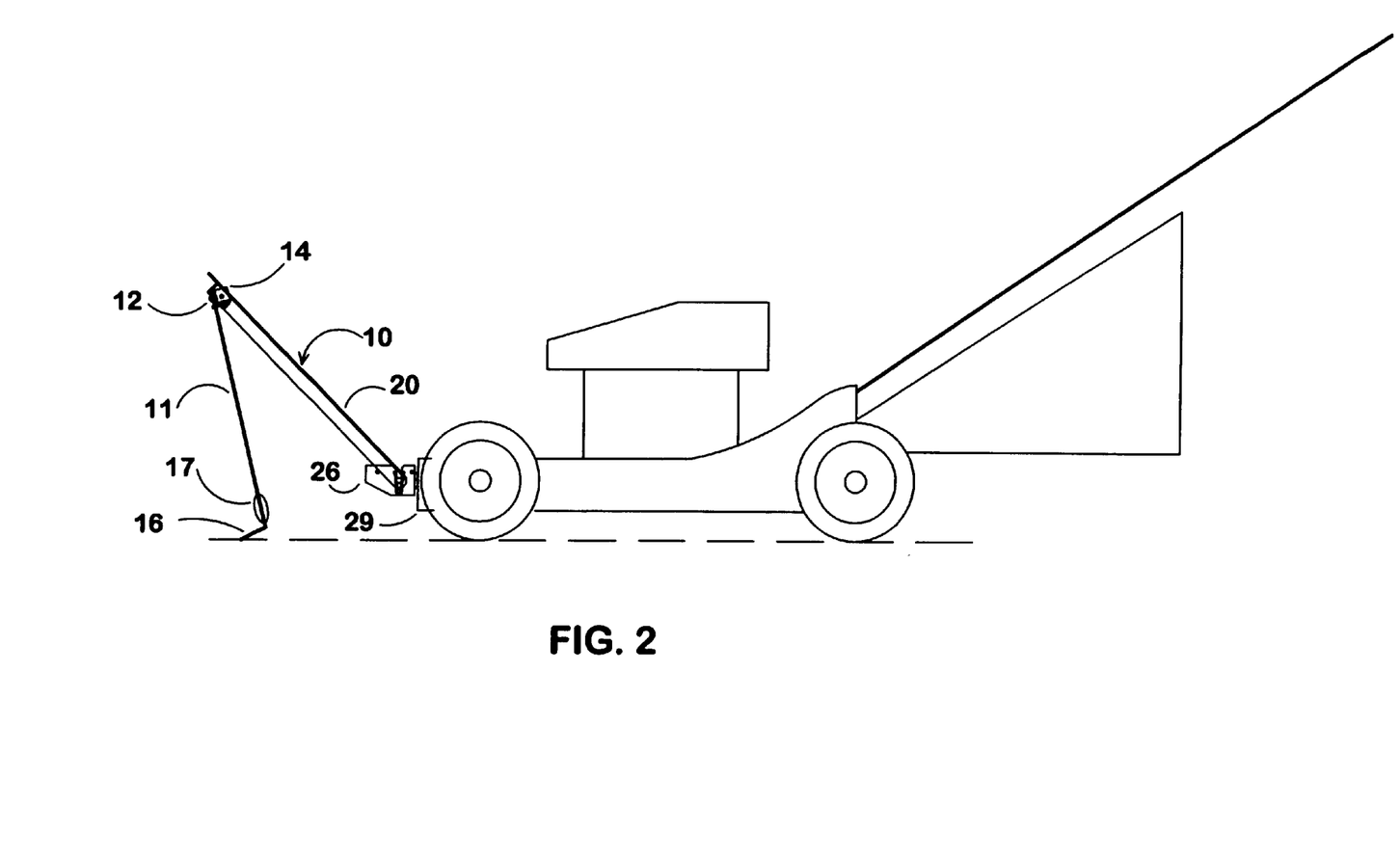
FIG. 2 is a side elevation of the lawnmower raking attachment in operative position.
Figure 3:
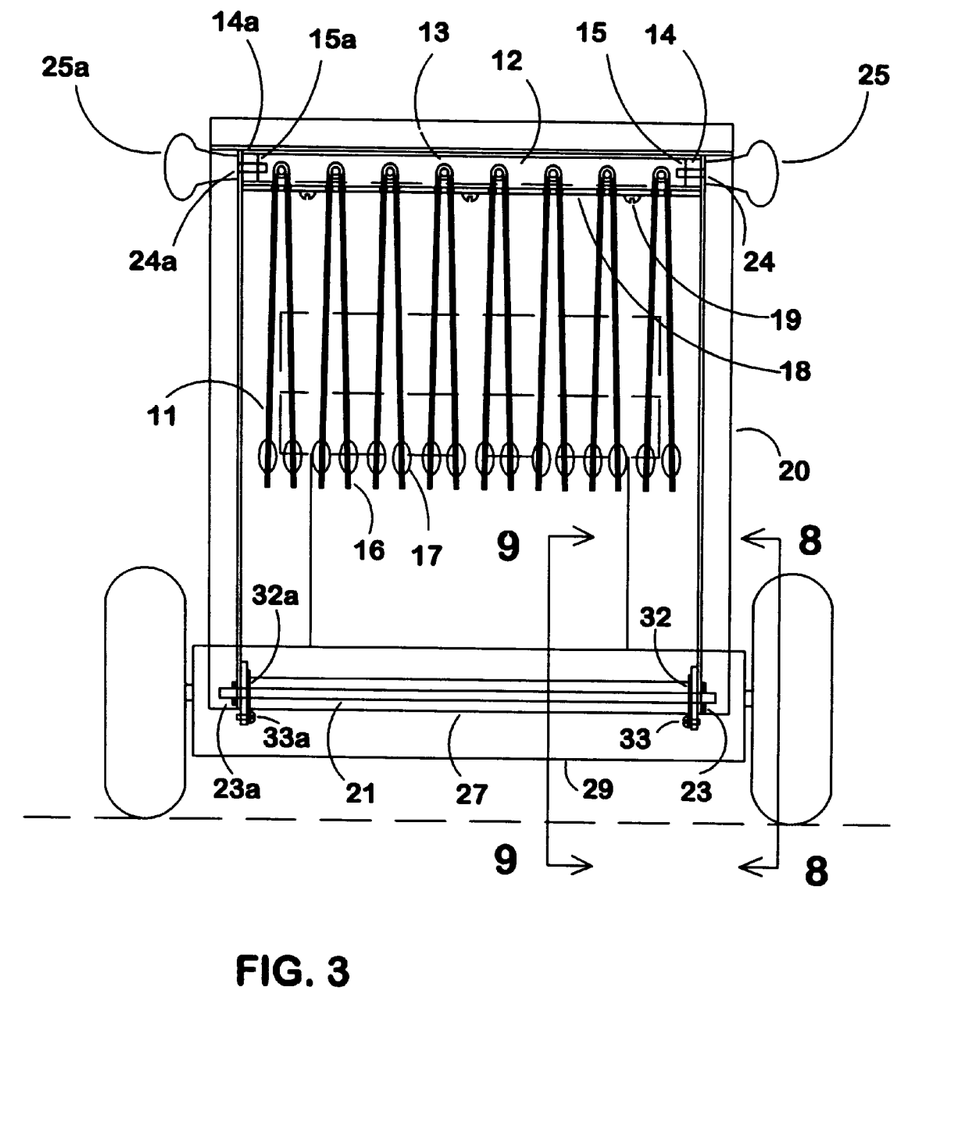
FIG. 3 is a front elevation view of the lawnmower raking attachment in resting position.
Figure 4:
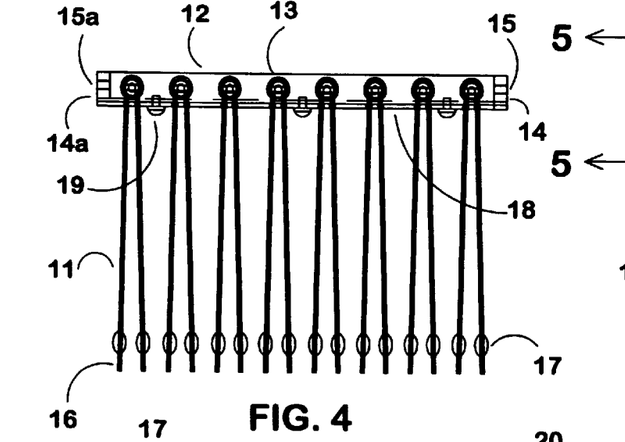
FIG. 4 is a front view of the tines and raking head.
Figure 5:
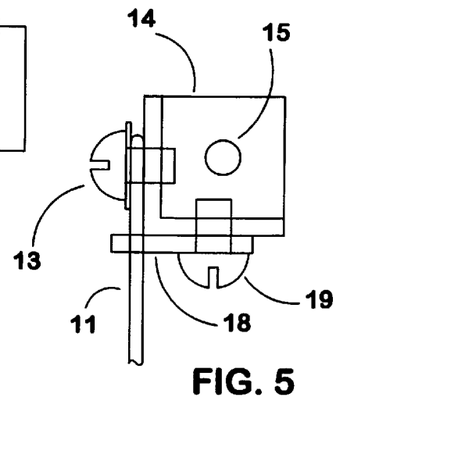
FIG. 5 is a partial enlarged side view of the tines and raking head seen on lines 5—5 of FIG. 4.
Figure 6:
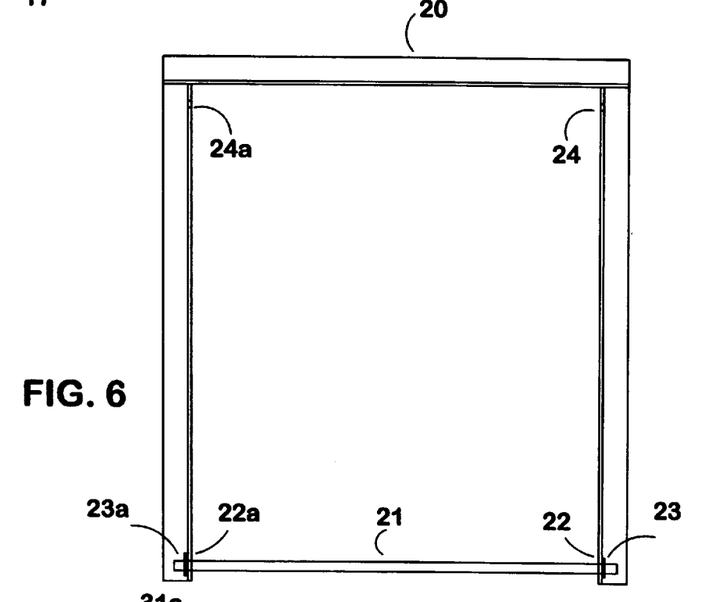
FIG. 6 is an elevation view of the U-shaped frame that holds the raking head rotatably and capable to be locked.

U-shaped frame 20 has a transverse shaft 21 through a first and second bores 22 and 22a at each arm near its open end. Said shaft 21 has perpendicular bores at both ends to accept a first and second cotter pins 23 and 23a. Purpose of said 23 and 23a is to maintain said shaft in place. A first and second bores 24 and 24a located respectively in each arm of 20 near its close end, accept a first and second thumbscrews 25 and 25a respectively. Said 25 and 25a threads respectively in said 15 and 15a. Said U-shaped frame 20 may be provided with reinforcing diagonal braces. Ensemble of said tines 11 and said raking head 12 is held between arms of said U-shape frame and near its close end by said 25 and 25a at any desired angular position to adjust the pressure of said tines 11 on the ground.

Figure 7:
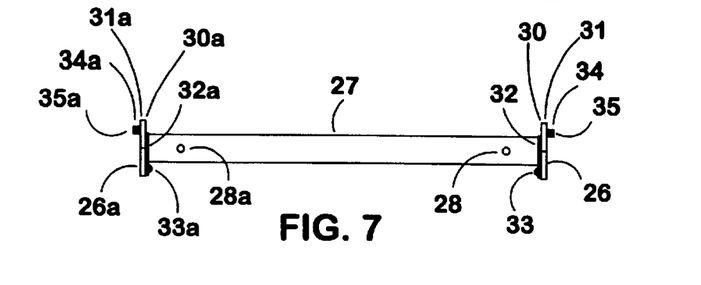
FIG. 7 is a front view of the supports and tie brace of the U-shaped frame.
Figure 8:
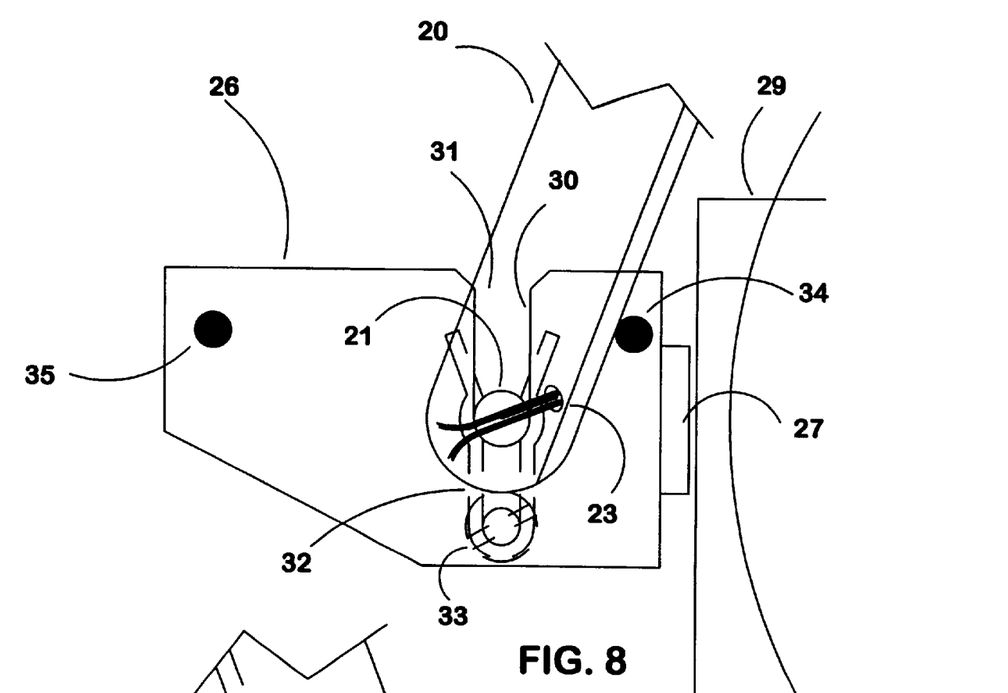
FIG. 8 is an enlarged external side view of the U-shaped frame support seen on lines 8—8 of FIG. 3.
Figure 9:
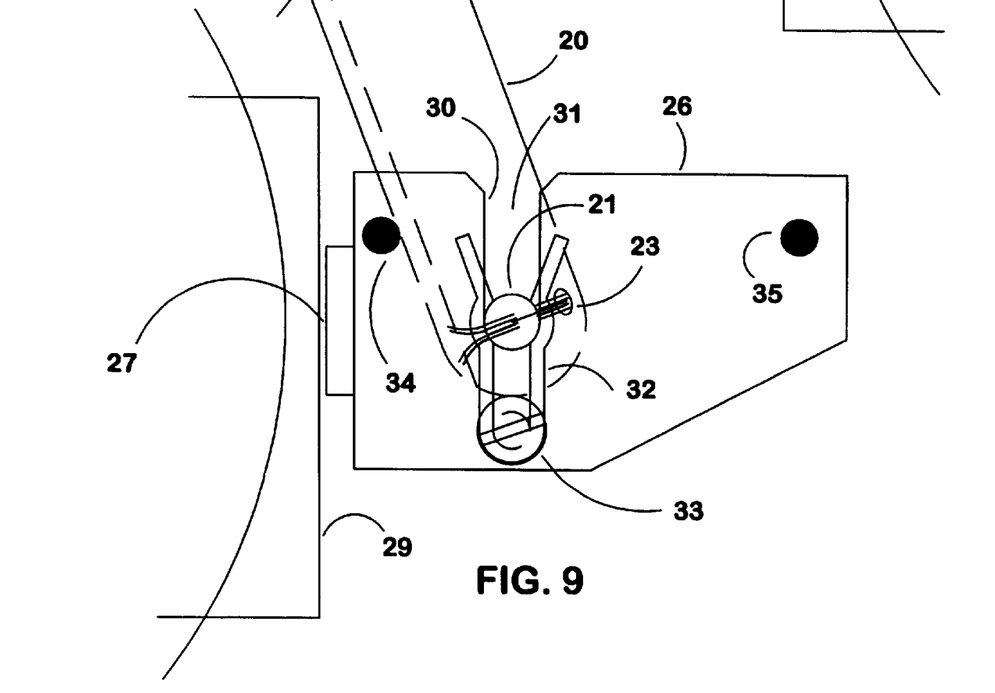
FIG. 9 is an enlarged internal view of the U shaped frame support seen on lines 9—9 of FIG. 3.
Figure 10:
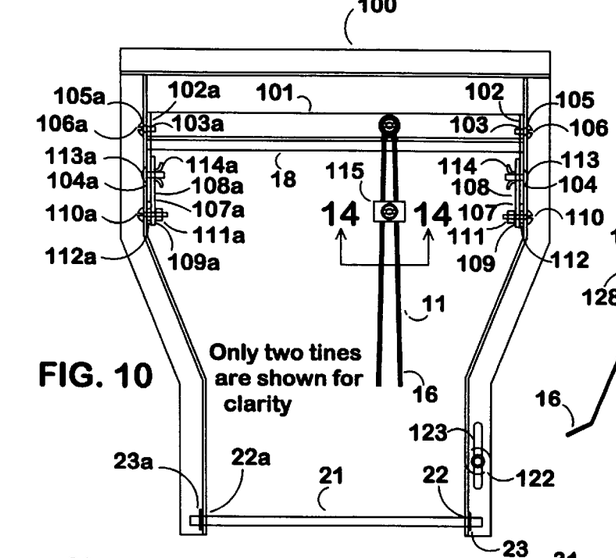
FIGS. 10 through 19 show alternatives for: raking frame, means to lock the rake head, means to latch rotatably the frame shaft, means to attach the frame supports to the lawnmower, and additional means to maintain tine separation.
Figures 11, 12:
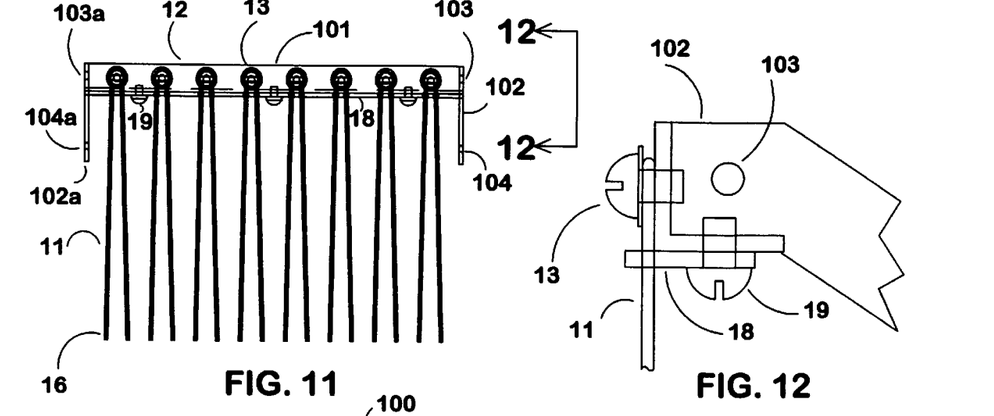
Figure 13:
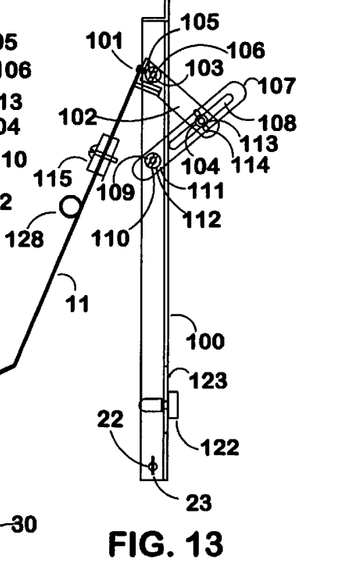
Figure 14:
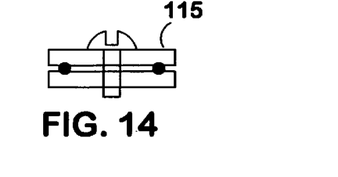
Figure 15:
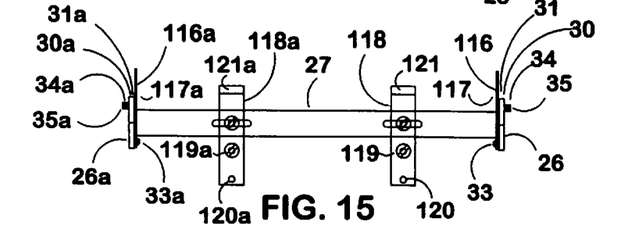
Figure 16:
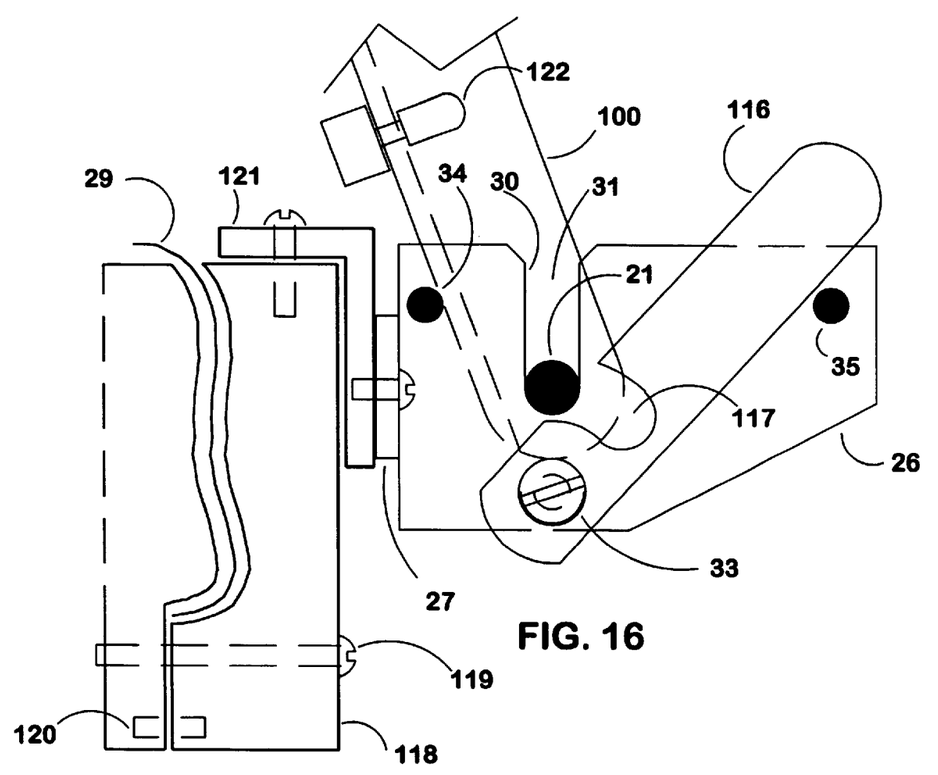
Figure 17:
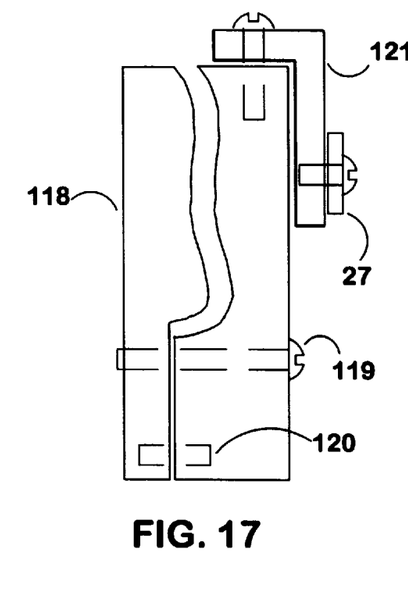
Figure 18:
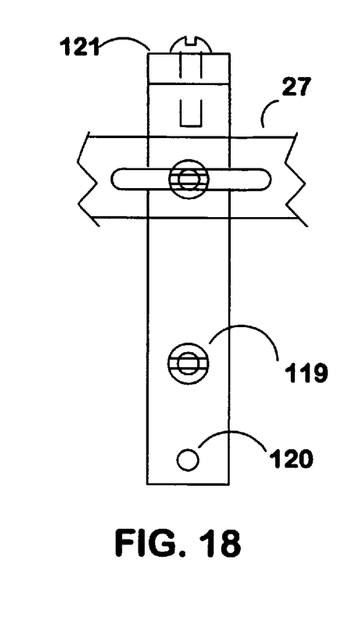

Frame supports 26 and 26a are braced by member 27. Said brace 27 has bores 28 and 28a to be secured to the forward end 29 of the lawnmower. Said frame supports 26 and 26a are equidistant from a lawnmower central vertical plane perpendicular to 29. Said supports 26 and 26a have respectively slots 30 and 30a perpendicular to a horizontal plane with the upper ends 31 and 31a open to accept simultaneously said shaft 21. Retaining cotter springs 32 and 32a are secured to said frame supports 26 and 26a by bolts 33 and 33a. Purpose of said 32 and 32a is to keep the ensemble of said tines 11, raking head 12 and U-shape frame 20 rotatably inside said slots 30 and 30a, and at the same time allow their installation and removal easily. Stoppers 34 and 34a limit backward rotation of said frame 20. Stoppers 35 and 35a limit forward rotational travel of said frame 20. Now the operation of the lawnmower raking attachment can be explained and understood. Said frame supports 26 and 26a are secured to a conventional lawnmower by bolts through said bores 28 and 28a. Said shaft 21 with said U-shape frame 20 is positioned in said slots 30 and 30a, and pushed down until said shaft is captured in a retaining fashion by said cotter springs 32 and 32a. Then said U-shape frame 20 is rotated forward until is stopped by said 35 and 35a. The pressure of said tines 11 on the ground is adjusted by means of said 25 and 25a. During the forward travel of the lawnmower with said raking attachment 10 in operative fashion the thatches are moved forward and some thatches are hooked by said tines 11 or trapped between them. By simply moving the lawnmower a little backward said rake frame swing backward to some degree in which position and the backward travel of the lawnmower said tines 11 release any thatch hooked or trapped. The normal vibration of the lawnmower is transmitted to said beads 17 increasing said tines 11 penetrating and release actions.

Referring to FIG. 10 through FIG. 14 description of elements already described are omitted. U-shaped raking frame 100 has its close end wider than its open end to allow for longer raking heads 101. Said raking head 101 have disposed elongated arms 102 and 102a attached respectively to each end of said 101 and extending outwardly. Said arms 102 and 102a have respectively a smooth circular bores 103 and 103a near the point of attachment to said 101. Said bores 103 and 103a are collinear. Said arms 102 and 102a have square bores 104 and 104a respectively at their free ends. Said bores 104 and 104a are collinear. Said U-shape frame 100 has threaded bores 105 and 105a disposed in each arm of 100. Said bores 105 and 105a are collinear and near the close end of 100. Said bores 105 and 105a accept dog point screws 106 and 106a. Dog point screws 106 and 106a have a portion of their end thread ground to a cylindrical shape to yield a pivoting point for bores 103 and 103a when threaded through said bores 105 and 105a respectively. A first and second elongated locking arms 107 and 107a have longitudinal slots 108 and 108a respectively. Said 107 and 107a have disposed respectively bores 109 and 109a at one end.

Pivot bolts 110 and 110a are disposed respectively in each arm of 100 equidistant from said 103 and 103a respectively. Said pivot bolts 110 and 110a accept bores 109 and 109a respectively. Lock nuts 111 and 111a are set to allow said arms 107 and 107a to rotate freely. Spacers 112 and 112a are disposed between said arms 107 and 107a and each arm of said 100 to provide alignment. Carriage bolts 113 and 113a are inserted through said bores 104 and 104a and said slots 108 and 108a respectively. By tightening wing nuts 114 and 114a the angular position of said raking head 101 relative to said raking frame 100 is locked providing means to adjust the pressure of tines 11 on the ground.

Two-piece clamps 115 are located at a moderate distance from said raking head 101. Said clamps 115 have matching grooves in their contacting surfaces to accept tines 11. Each clamp 115 grips together at least to tines 11 to help maintain separation of said tines 11. Each tine 11 is coiled 128 between said 115 and said 16 in a plain perpendicular to said frame 100 to increase tine flexibility.

According to another embodiment not shown in the accompanying drawings said tine head 101 and said elongated arms 102 and 102a are made of high impact plastic and the tines 11 are inserted during the molding process.

Referring now to FIGS. 15 through 19 description of elements already described are omitted. Latching arms 116 and 116a are disposed pivotally on frame supports 26 and 26a around screws 33 and 33a respectively. Said screws 33 and 33a are set to provide friction between said latching arms 116 and 116a and said frame supports 26 and 26a respectively to retain said shaft 21 rotatably in the bottom of said 31 and 31a. Said latching arms 116 and 116a have slots 117 and 117a respectively. Said slots 117 and 117a have respectively one end open. Sides of said slots 117 and 117a are defined in a fashion to be tangent to said shaft 21 when pivoted on 33 and 33a respectively. Said latching arms 116 and 116a can be rotated toward shaft 21 until said shaft 21 touches the bottom of said slots 117 and 117a in which position stay by the friction provided by 33 and 33a. Two-piece clamps 118 and 118a are clamped to the front end of a lawnmower. Said clamps 118 and 118a consist of two pieces each with their contacting surfaces shaped to conform with the cross section of the front end 29 of the lawnmower. Screws 119 and 119a close said clamps 118 and 118a. Dowel pins 120 and 120a maintain alignment of the two halve of 118 and 118a.

Horizontal arms of angular brackets 121 and 121a are bolted respectively to the top of the outer halve of said 118 and 118a. Brace bar 27 is bolted to the vertical arm of said 118 and 118a. Said brace bar 27 may be mounted directly on the front surface of the outer halve of said 118 and 118a. Stopper seat 122 is defined to slide in a longitudinal slot 123 along one arm of 100 and near its open end. When said stopper seat 122 is in its uppermost position said rake frame 100 can be rotated to its resting position. When said stopper seat 122 is in its lowest position said raking frame 100 can not be rotated enough to reach the resting position and is forced to rotate to the operational position generally by gravity.

Figure 19:
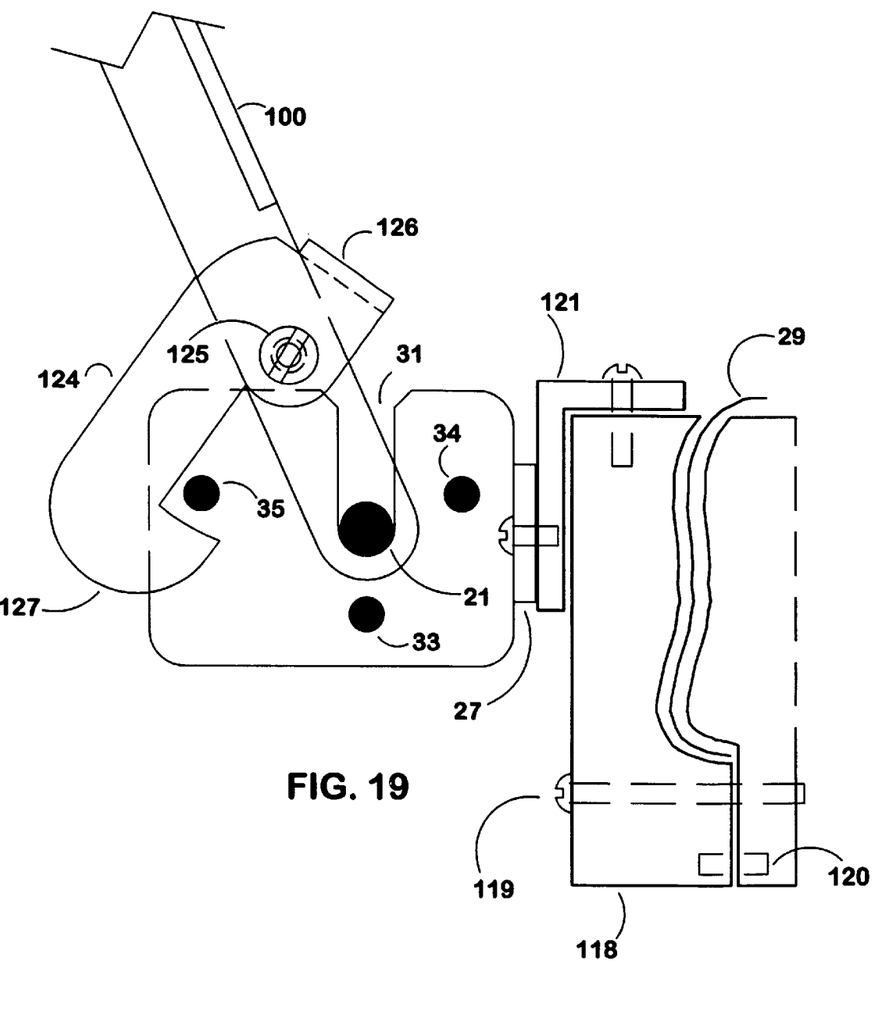

FIG. 19 shows another alternative to prevent said rake frame 100 from going to the resting position during the raking operation. Intentionally latching arm 116 is omitted in FIG. 19 for clarity. Elongated finger arm 124 is disposed pivotally on said on one side arm of 100 near shaft 21. Shoulder screw 125 provides the pivot point for said 124. The end 126 of said 124 near the pivot point is bent in a manner to limit its rotation. The other end shape 127 is fashioned in a manner to engage with said stopper 35 preventing said 100 from going to resting position. In order to rotate said 100 to resting position said 124 have to be disengaged manually by simply rotating said 124 to a release position slightly away from said 35.

The present disclosure contains that contained in the appended claims as well as that of the foregoing description. Although the invention has been disclosed in its preferred forms with a certain degree of particularity, it is understood that the invention of the preferred form has been made by way of example, that numerous changes in the details of construction and the combination and arrangement of parts may be resorted to without departing from the spirit and scope of the invention.

What is claimed is:

1. A lawnmower raking attachment comprising in combination:
   - a U-shaped frame means with a close end, two side arms and an open end;
   - a transverse shaft connecting the open end of said U-shaped frame;
   - a first and second frame supports joined by a brace member each with a vertical slot with the upper end open to accept simultaneously and pivotally said shaft, having each a pair of stoppers that allows said U-shaped frame to adopt a forwardly stable operational position or an upwardly stable resting position;
   - a tine head held pivotally between sides of said U-shaped frame, near the close end with a plurality of tines extending downwardly with the free end bent forwardly having each tine at least one slidable and rotatable bead.

2. A lawnmower raking attachment as set forth in claim 1 wherein two tines are made by bending a long flexible rod in a U-shape and securing the close end to said tine head.

3. A lawnmower raking attachment as set forth in claim 1 wherein a rack with grooves sized to embrace two integral tines is secured to the tine head to maintain tine separation.

4. A lawnmower raking attachment as set forth in claim 1 wherein means are provided to prevent said frame transverse shaft to escape from said supports.

5. A lawnmower raking attachment as set forth in claim 1 wherein means are provided to lock said rotatably rake head in any angular position to adjust the pressure of the tines on the ground.

6. A lawnmower raking attachment as set forth in claim 1 wherein means are provided to attach said first and second frame supports with the brace member to the front end of a lawnmower.

\* \* \* \* \*